(12) United States Patent
Davis

(10) Patent No.: US 7,544,435 B2
(45) Date of Patent: Jun. 9, 2009

(54) ELECTROCHEMICAL CELL SYSTEMS COMPRISING FUEL CONSUMING AGENTS

(75) Inventor: Stuart M. Davis, Norfolk, MA (US)

(73) Assignee: The Gillette Company, Boston, MA (US)

( * ) Notice: Subject to any disclaimer, the term of this patent is extended or adjusted under 35 U.S.C. 154(b) by 1035 days.

(21) Appl. No.: 10/438,004

(22) Filed: May 15, 2003

(65) Prior Publication Data
US 2004/0229101 A1    Nov. 18, 2004

(51) Int. Cl.
*H01M 2/00* (2006.01)
(52) U.S. Cl. .............. 429/34; 429/40; 429/12
(58) Field of Classification Search ........... 429/34, 429/38, 27, 40; 427/115; 220/581
See application file for complete search history.

(56) References Cited

U.S. PATENT DOCUMENTS

| | | | |
|---|---|---|---|
| 3,893,870 A | 7/1975 | Kozawa | |
| 4,751,151 A | 6/1988 | Healy et al. | |
| 5,223,102 A | 6/1993 | Fedkiw, Jr. et al. | |
| 5,837,158 A | 11/1998 | Shepodd et al. | |
| 6,333,123 B1 | 12/2001 | Davis et al. | |
| 6,428,922 B2 | 8/2002 | Bailey | |
| 6,500,576 B1 | 12/2002 | Davis et al. | |
| 2002/0076588 A1 | 6/2002 | Singh et al. | |
| 2002/0127458 A1* | 9/2002 | Pratt et al. | 429/34 |
| 2002/0160241 A1 | 10/2002 | Huang | |
| 2003/0082428 A1 | 5/2003 | Boneberg et al. | |
| 2003/0134161 A1* | 7/2003 | Gore et al. | 429/12 |
| 2003/0134162 A1* | 7/2003 | Gore et al. | 429/13 |
| 2003/0203263 A1* | 10/2003 | Brown et al. | 429/31 |
| 2004/0229090 A1 | 11/2004 | Davis et al. | |

FOREIGN PATENT DOCUMENTS

| | | |
|---|---|---|
| EP | 62 061 278 | 3/1987 |
| EP | 2 002 093 435 | 3/2002 |
| EP | 1 416 551 A2 | 5/2004 |
| JP | 2002-093435 | 3/2002 |
| JP | 2002-372303 | 12/2002 |
| WO | WO 00/36687 | 6/2000 |
| WO | WO 02/099917 A2 | 12/2002 |

OTHER PUBLICATIONS

Bae, I., "IR-ATR Spectroscopy for methanol electro-oxidation," Excerpt from 3rd Quarterly Report and Annual Report 1994.

(Continued)

*Primary Examiner*—Raymond Alejandro
(74) *Attorney, Agent, or Firm*—Fish & Richardson P.C.

(57) ABSTRACT

Electrochemical cell systems are provided. In some implementations, the electrochemical cell system includes a fuel cell and a fuel cartridge connected to the fuel cell. The fuel cell includes (i) a fuel cell housing having a first external surface and a first internal surface defining a first internal volume of the fuel cell housing, and (ii) a cathode, an anode, and an electrolyte disposed within the first internal volume. The fuel cartridge includes (F) a cartridge housing having a second external surface and a second internal surface defining a second internal volume of the cartridge housing, wherein the second internal volume includes a fuel; and (ii) a fuel consuming agent disposed on at least one of the first external surface and the second external surface.

33 Claims, 2 Drawing Sheets

OTHER PUBLICATIONS

Liu, R. et al., "Partial Oxidation of Methanol on a Metallized Nafion Polymer Electrolyte Membrane," *J. Electrochem. Soc.*, vol. 139, No. 12, pp. 3514-3523, 1992.

Williford, R.E. et al., "A combined passive water vapor exchanger and exhaust gas diffusion barrier for fuel cell applications", *J. Power Sources*, vol. 112, pp. 570-576, 2002.

* cited by examiner

ELECTROCHEMICAL CELL SYSTEMS COMPRISING FUEL CONSUMING AGENTS

TECHNICAL FIELD

This invention relates to fuel consuming agents and methods of consuming fuel.

BACKGROUND

A fuel cell is a device capable of providing electrical energy from an electrochemical reaction, typically between two or more reactants. Generally, a fuel cell includes two electrodes, called an anode and a cathode, and an electrolyte disposed between the electrodes. The anode contains an anode catalyst, and the cathode contains a cathode catalyst. The electrolyte, such as a solid membrane electrolyte, is typically ionically conducting but electronically non-conducting.

During operation of the fuel cell, the reactants are introduced to the appropriate electrodes. At the anode, a reactant interacts with the anode catalyst and forms reaction intermediates, such as ions and electrons. The ionic reaction intermediates can flow from the anode, through the electrolyte, and to the cathode. The electrons, however, flow from the anode to the cathode through an external electrical conductor connecting the anode and the cathode. As electrons flow through the external electrical conductor, the electron flow can be used to provide energy. At the cathode, the cathode catalyst interacts with another reactant, the ions formed at the anode, and the electrons to complete the fuel cell reaction.

For example, in one type of fuel cell, sometimes called a hydrogen fuel cell, the anode reactant is hydrogen gas, and the cathode reactant is oxygen (e.g., from air). At the anode, hydrogen gas is oxidized to form protons; at the cathode, oxygen gas is reduced and combines with protons to form water:

Anode Reaction: $H_2 \rightarrow 2H^+ + 2e^-$    (1)

Cathode Reaction: $\tfrac{1}{2}O_2 + 2H^+ + 2e^- \rightarrow H_2O$    (2)

Overall Reaction: $H_2 + \tfrac{1}{2}O_2 \rightarrow H_2O$    (3)

As shown in Equation (1), oxidation of hydrogen produces protons and electrons. The protons flow from the anode, through the electrolyte, and to the cathode. The electrons flow from the anode to the cathode through an external electrical conductor, which can provide electrical energy. At the cathode, the protons and the electrons react with oxygen to form water (Equation 2). Equation 3 shows the overall fuel cell reaction, whereby hydrogen and oxygen are converted into water.

SUMMARY

In general, a fuel cell or fuel cartridge has a fuel consuming agent on or in the vicinity of its external surface. The fuel consuming agent can be used to control a fuel leak by consuming the leaking fuel.

In one aspect, an electrochemical cell system includes a fuel cell with a fuel cell housing having an external surface and an internal surface defining an internal volume of the fuel cell housing. Within the internal volume are a cathode, an anode, and an electrolyte. The cell system further includes a fuel cartridge which is connected to the fuel cell. The cartridge has a cartridge housing with an external surface and an internal surface defining an internal volume of the cartridge housing, the internal volume including a fuel. The cell system also includes a fuel consuming agent that is disposed on at least one of the external surface of the fuel cell housing and the external surface of the fuel cartridge.

In another aspect, an electrochemical cell system includes a fuel cell with a fuel cell housing, and a fuel cartridge connected to the fuel cell, the cartridge having a cartridge housing. A fuel consuming agent is disposed on at least one of the fuel cell housing and the cartridge housing.

In another aspect, an electrochemical cell includes a fuel cell having a housing with an external surface and an internal surface. The internal surface defines an internal volume of the housing. A fuel consuming agent is disposed on the external surface.

A hydrogen gas cartridge can have a housing including hydrogen gas. The housing has an external surface and an internal surface defining an internal volume. A hydrogen consuming agent is disposed on the external surface and is dispersed in a gas-permeable matrix.

A fuel cartridge can have a housing including a fuel. The housing has an external surface and an internal surface defining an internal volume. A fuel consuming agent is disposed on the external surface and is dispersed in a gas-permeable matrix.

In another aspect, an electrochemical cell system includes a container with an internal surface defining an internal volume, and a fuel consuming agent and a fuel cell or fuel cartridge disposed within the internal volume.

In another aspect, a method of coating a fuel cell includes coating a portion of an external surface of a fuel cell with a fuel consuming agent.

In another aspect, a method of coating a fuel cartridge includes coating a portion of an external surface of a fuel cartridge with a fuel consuming agent that is dispersed in a gas-permeable matrix.

In another aspect, a method of controlling a fuel leak includes contacting fuel leaking from an electrochemical cell system having a fuel cell with a fuel consuming agent external to the fuel cell.

Embodiments can include one or more of the following features. In some embodiments, the fuel cell is a hydrogen fuel cell. The hydrogen fuel cell can have an external surface. The hydrogen fuel cell can include a housing with the external surface and an internal surface defining an internal volume.

The fuel consuming agent can be a hydrogen consuming agent (e.g., a hydrogen recombining agent, a hydrogen getter). The hydrogen consuming agent can be dispersed in a gas-permeable matrix (e.g., a silicone polymer). The cell system can include a coating over the hydrogen consuming agent.

In some cases, the fuel cartridge is a hydrogen fuel cartridge.

The fuel cell can be a methanol fuel cell, an ethanol fuel cell, a methane fuel cell, a propane fuel cell, a butane fuel cell, a formic acid fuel cell, a hydrazine fuel cell, or an ammonia fuel cell.

The fuel can be methanol, ethanol, methane, propane, butane, formic acid, hydrazine, ammonia, or a combination thereof.

The fuel cartridge can be a methanol fuel cartridge, an ethanol fuel cartridge, a methane fuel cartridge, a propane fuel cartridge, a butane fuel cartridge, a formic acid fuel cartridge, a hydrazine fuel cartridge, or an ammonia fuel cartridge.

In some embodiments, the hydrogen recombining agent includes a hydrogen oxidizing material and an activating material. The activating material can have a first activating component and a second activating component, the first and second activating components each being capable of cleaving hydrogen. The hydrogen oxidizing material can include a manganese oxide, a manganese oxyhydroxide, a nickel oxyhydroxide, a copper oxide, a barium oxide, a silver oxide, a mercury oxide, potassium permanganate, silver permanganate, a manganese phosphate, a bismuth oxide, m-dinitrobenzene, and/or a quinone. The hydrogen oxidizing material can include a copper oxide. In some cases, the first component of the activating material includes a transition metal (e.g., palladium, platinum, ruthenium), or a salt or oxide thereof. The second component of the activating material can include a transition metal (e.g., palladium, platinum, ruthenium), or a salt or oxide thereof.

In some cases, the fuel cell housing is releasably engageable with the cartridge housing. The fuel cell can have a cathode, an anode, and an electrolyte disposed within its internal volume. In some cases, the anode oxidizes hydrogen gas. In some embodiments, a fuel cartridge is connected to the fuel cell.

The electrochemical cell can include a fuel sensor.

In some cases, coating the external surface includes painting, spraying, and/or printing the external surface with the fuel consuming agent. Coating the external surface can include dipping the external surface in the fuel consuming agent.

The fuel cartridge can have an external surface and an internal surface defining an internal volume. The internal volume can include fuel.

Embodiments can include one or more of the following advantages. A fuel cell, cartridge, or container including the fuel consuming agent may be safer than it would be without the fuel consuming agent. A fuel cell, cartridge, or container including the fuel consuming agent may require little to no human intervention in the event of a fuel leak because, for example, the agent consumes any potentially dangerous fuel as it leaks from the cell, cartridge or container. A fuel consuming coating including the fuel consuming agent can convert a potentially harmful, flammable fuel (e.g., hydrogen gas) into relatively harmless, nonflammable byproducts (e.g., water). The conversion from fuel to harmless byproducts can occur at ambient temperatures. Furthermore, the fuel consuming reaction may occur without generating significant heat or causing an increase in temperature. Thus, the reaction may not generate sufficient heat to induce ignition of the air-fuel mixture. The fuel consuming agent may address a fuel leak in a relatively timely manner. A fuel consuming agent used in conjunction with a fuel sensor can both signal the presence of a fuel leak and eliminate the fuel released by the fuel leak. The fuel consuming agent can be made economically and efficiently, with inexpensive and readily available materials. The fuel consuming agent can be durable; it can form a coating that is resistant to peeling, flaking, or crumbling. A fuel cartridge including the fuel consuming agent can be a portable and safe source of, e.g., hydrogen gas.

The details of one or more embodiments of the invention are set forth in the accompanying drawings and the description below. Other features and advantages of the invention will be apparent from the description and drawings, and from the claims.

DETAILED DESCRIPTION

Figure 1:
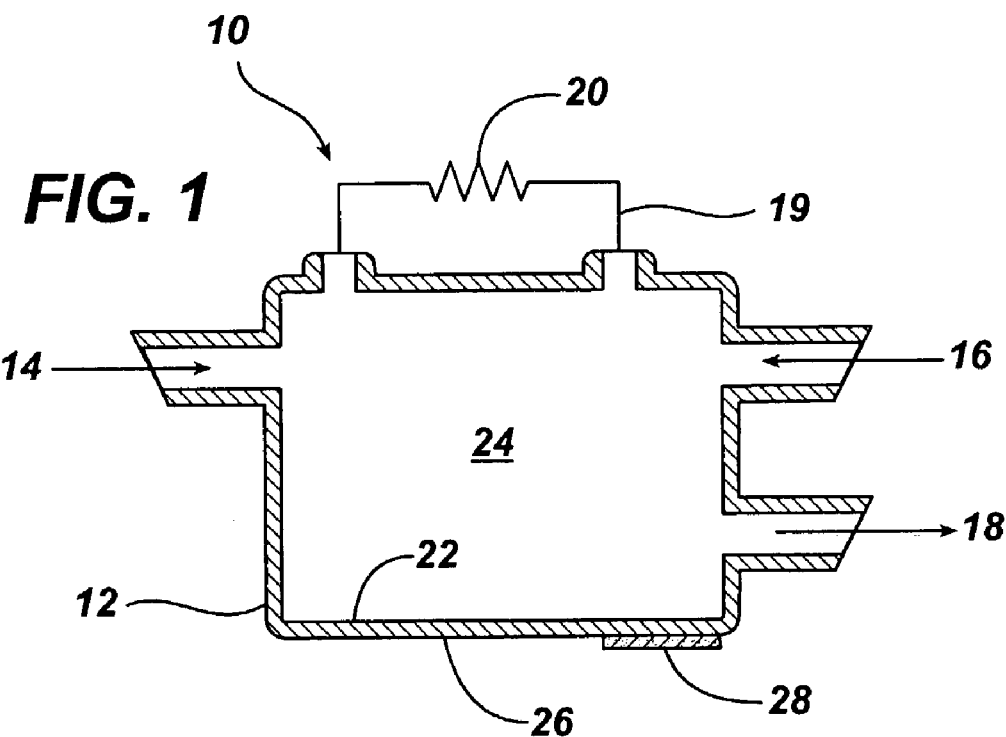
FIG. 1 is a cross-sectional side view of a fuel cell.
Figure 2:
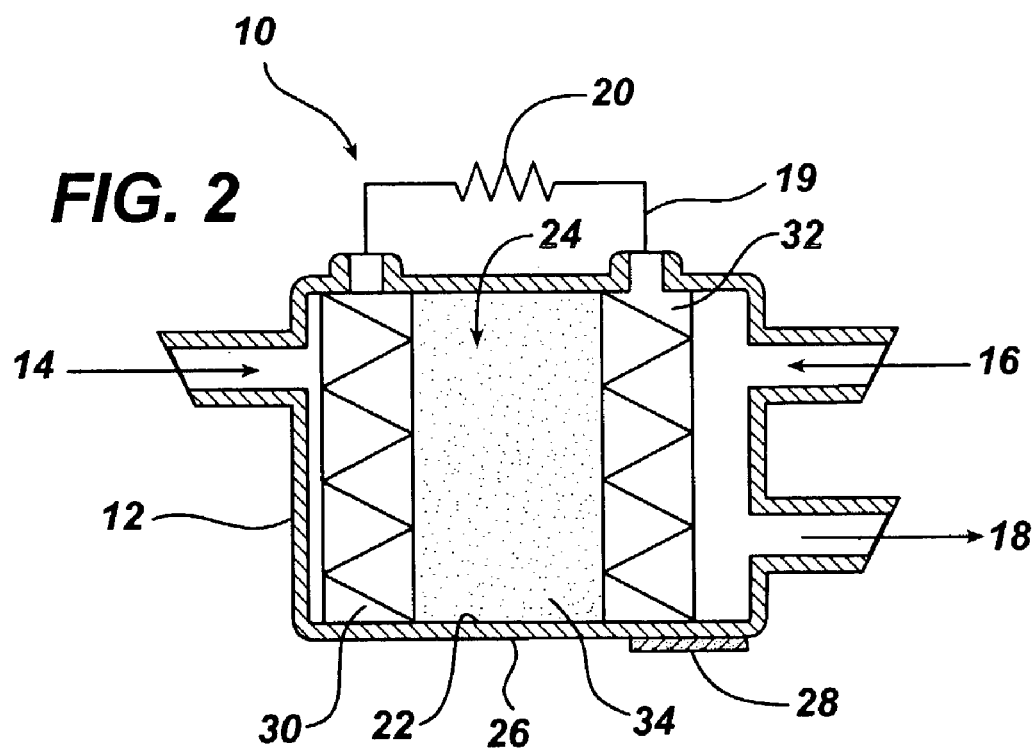
FIG. 2 is a more detailed cross-sectional side view of the fuel cell of FIG. 1.

Referring to FIGS. 1 and 2, a hydrogen fuel cell 10 includes a housing 12, a hydrogen fuel inlet 14, an oxygen or air inlet 16, and a water outlet 18. Water outlet 18 also can exhaust oxygen-depleted air, in the event that the fuel cell is provided with air. Fuel cell 10 further includes a conductor 19 that can include a load 20. The housing 12 has an internal surface 22 defining an internal volume 24, as well as an external surface 26. The external surface 26 includes a fuel consuming coating 28.

Coating 28 can cover a portion of the external surface of fuel cell 10, as shown in FIGS. 1 and 2, or can cover the entire external surface of fuel cell 10. The coating can cover multiple portions of the external surface of the fuel cell. The coating can, for example, be used in areas of the fuel cell with the highest likelihood of having a fuel leak, such as adjacent to hydrogen fuel inlet 14.

Referring now to FIG. 2, internal volume 24 of fuel cell 10 includes an anode 30 and a cathode 32. The internal volume also includes an electrolyte 34. The anode oxidizes hydrogen gas, thereby producing protons. The protons move through electrolyte 34 to cathode 32, where they combine with oxygen to produce water. In the process, electrons are transferred between the anode and the cathode, thus creating an electrical current.

Anode 30 can be formed of a material capable of interacting with hydrogen gas to form protons and electrons (i.e., any material capable of catalyzing the dissociation and oxidation of hydrogen gas). Examples of such materials include, for example, platinum, platinum alloys, such as platinum-ruthenium, and platinum dispersed on carbon black.

In some cases, the fuel cell housing includes an outlet on the side at which the fuel cell anode is located, the outlet allowing for the flow of fuel into and out of the anode side of the housing.

Cathode 32 can be formed of a material capable of catalyzing the reaction between oxygen, electrons, and protons to form water. Examples of such materials include, for example, platinum, platinum alloys, and noble metals dispersed on carbon black.

Electrolyte 34 is capable of allowing ions to flow through it while also providing a substantial resistance to the flow of electrons. In some embodiments, electrolyte 34 is a solid polymer (e.g., a solid polymer ion exchange membrane), such as a solid polymer proton exchange membrane. An example of a solid polymer proton exchange membrane is a solid polymer containing sulfonic acid groups. Such membranes are commercially available from E.I. DuPont de Nemours Company (Wilmington, Del.) under the trademark NAFION® membranes. Alternatively, electrolyte 34 can also be prepared from the commercial product GORE-SELECT® membrane, available from W.L. Gore & Associates (Elkton, Md.).

In some embodiments, electrolyte 34 can be an ionically conducting liquid electrolyte (e.g., aqueous potassium hydroxide solution, aqueous sodium hydroxide solution, aqueous sulfuric acid solution, or aqueous phosphoric acid solution). The liquid electrolyte can be a free liquid or it can be immobilized by the addition of a gelling agent, such as a polymer (e.g., polyacrylic acid or polymethacrylic acid), or an absorbing agent (e.g., silica gel, fumed silica, or clay).

Housing 12 can be any conventional housing commonly used in fuel cells. For example, housing 12 can be a plastic, carbon, or metal container such as steel, stainless steel, graphite, nylon, polyvinyl chloride, poly-tetrafluoroethylene, polyvinylidene fluoride, perfluoro-alkoxy resin or a combination of metals, carbons and plastics. Plastics may be filled, e.g., with mineral fillers. Alternatively, plastics may be unfilled.

Figure 3:
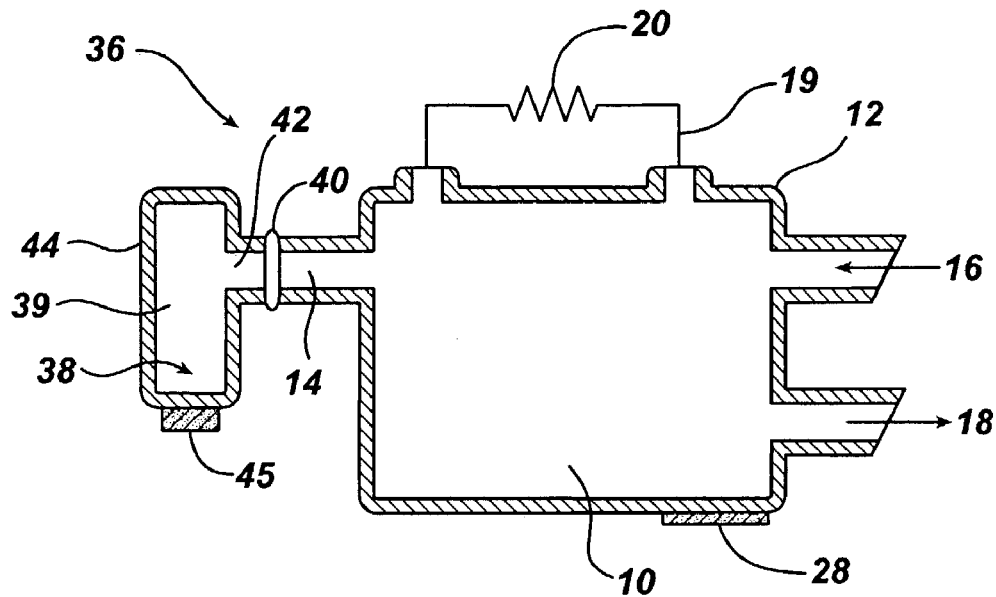
FIG. 3 is a cross-sectional side view of a fuel cell system.

Although a hydrogen fuel cell is shown in FIGS. 1 and 2, the fuel cell alternatively can be a methanol fuel cell. The fuel cell can be an electrochemical cell which uses oxidizable fuel, such as ethanol, methane, propane, butane, formic acid, hydrazine, or ammonia. In methanol, ethanol, methane, propane, butane, formic acid, hydrazine, or ammonia fuel cells, the anode material can catalyze the oxidation of the fuel to a mixture of water and carbon dioxide (for methanol, ethanol, methane, propane, butane, or formic acid fuel cells) or water and nitrogen gas (for hydrazine or ammonia fuel cells). Referring now to FIG. 3, in some cases the hydrogen fuel cell is releasably coupled to a fuel source, such as a fuel cartridge. The fuel cartridge can, for example, include a housing containing hydrogen gas or a hydrogen generator. In some cases, the fuel cartridge can include a hydrogen-gas producing electrochemical cell (such as the system described in "Electrochemical Cells", U.S. Ser. No. 10/438,318, filed May 15, 2003 and published as US-2004-0229090-A1, the entire contents of which are incorporated by reference.) In cases in which the fuel cell is a methanol fuel cell, the cartridge can include a housing containing liquid methanol or a solution of methanol in water, or a methanol generator.

In FIG. 3, a hydrogen fuel cell system 36 includes a hydrogen fuel cartridge 38, which includes hydrogen gas or a hydrogen generator in its internal volume 39. Cartridge 38 has a housing 44 and a hydrogen fuel outlet 42.

Fuel cell system 36 also includes fuel cell 10, which has housing 12, oxygen or air inlet 16, water outlet 18, and conductor 19, which includes load 20.

Cartridge 38 is connected to fuel cell 10 by a connecting portion 40. The connecting portion forms a fluid connection between the hydrogen fuel inlet 14 of the fuel cell and the hydrogen fuel outlet 42 of the cartridge. Hydrogen gas can be transferred from the cartridge to the fuel cell through the fluid connection. When hydrogen gas is no longer needed by the fuel cell, the fluid connection can be closed, or the cartridge can be detached from the fuel cell.

In FIG. 3, housing 12 of the hydrogen fuel cell can include fuel consuming coating 28. Housing 44 of cartridge 38 can include a fuel consuming coating 45. While coatings 28 and 45 are included on the housings of both the fuel cartridge and the fuel cell in FIG. 3, in other embodiments one of coating 28 and coating 45 can be present. In some cases, the coating or coatings can cover the entirety of the external surfaces of the both the fuel cell housing and the cartridge housing. In other cases, the coating or coatings can cover portions of the external surface of the overall fuel cell system.

Figure 4:
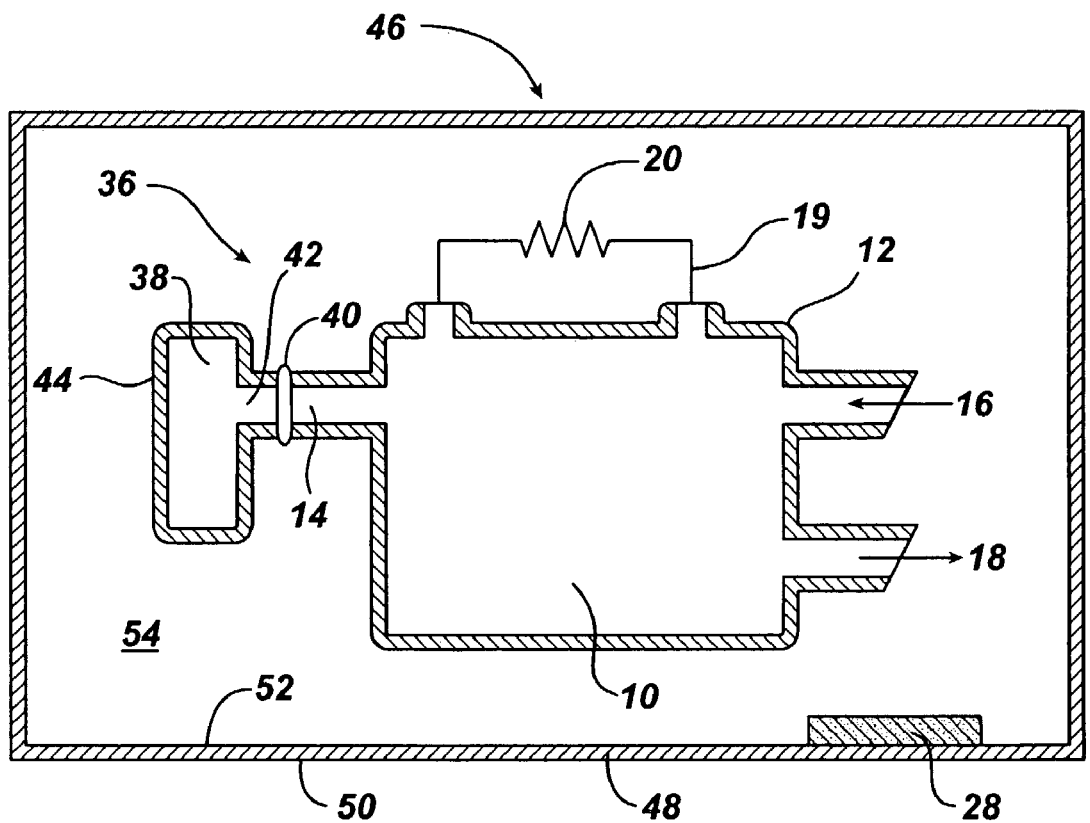
FIG. 4 is a cross-sectional side view of a container.

Referring to FIG. 4, a container 46 includes a housing 48 having an external surface 50 and an internal surface 52 defining an internal volume 54. Hydrogen fuel cell system 36 is encased or otherwise contained within internal volume 54. Hydrogen fuel cell system 36 includes hydrogen fuel cartridge 38 with housing 44 and hydrogen fuel outlet 42. Fuel cell system 36 also includes hydrogen fuel cell 10 with oxygen inlet 16, water outlet 18, housing 12, and conductor 19 with load 20. Fuel cell 10 is connected to cartridge 38 by a connecting portion 40. The connecting portion forms a fluid connection between the hydrogen fuel inlet 14 of the fuel cell and the hydrogen fuel outlet 42 of the cartridge.

Fuel consuming coating 28 covers a portion of internal surface 52. In some cases, the coating can cover all of the internal surface, or a larger or smaller portion of the internal surface than is shown in FIG. 4. Coating 28 can cover multiple portions of the internal surface of the container. In some cases, both the fuel cell system and the container can include a coating. In other cases, the fuel cell system includes a coating, but the container does not include a coating. In some embodiments, both or one of the external and internal surfaces of the container are coated with the coating.

Container 46 can be, for example, a briefcase, a shipping package, display packaging, a storage case, or a carrying case. In some cases, the container is a room, a train compartment, an airplane cabin, or an automobile.

The coating can be less than about 0.125 inch thick (e.g., between about 0.010 inch and about 0.063 inch thick). The coating can have a uniform thickness or the coating can be thicker in some regions than it is in other regions.

Coating 28 can react with hydrogen gas that leaks out of the hydrogen fuel cell. In FIGS. 1 and 2, coating 28 includes a hydrogen consuming agent, such as a hydrogen getter or a hydrogen recombining agent (e.g., a hydrogen recombination catalyst). A hydrogen recombining agent promotes the oxidation of hydrogen by atmospheric oxygen to produce water. A hydrogen getter absorbs hydrogen by reacting the hydrogen with an oxidizing agent.

Suitable hydrogen recombination catalysts and hydrogen getters are described in U.S. Pat. No. 6,500,576, and U.S. Pat. No 6,333,123, each of which is incorporated by reference in its entirety. The recombination catalyst can include an activating catalyst and a binder. The activating catalyst can be dispersed in the binder. For example, the activating catalyst can be dissolved in, or homogeneously distributed throughout, the binder. The dispersion can be encapsulated by a membrane. The activating catalyst can be formed from a hydrogen oxidizing material mixed with a catalyst, or from a catalyst precursor which is reduced in situ to a catalyst. For example, the oxidizing material can include copper oxide, which is reduced in situ to copper metal. The catalyst precursor can include platinum chloride or ruthenium chloride, or a mixture of platinum chloride and ruthenium chloride. The catalyst precursor can be reduced in situ to form the catalyst. Once reduced, the copper metal and the platinum and/or ruthenium can act as catalysts for the recombination of hydrogen. The hydrogen getter can include a hydrogen oxidizing material, an activating catalyst, and a binder. The hydrogen oxidizing material and the activating catalyst can be dispersed in the binder. For example, the hydrogen oxidizing material and the activating catalyst can be dissolved in, or homogeneously distributed throughout, the binder. The dispersion can be encapsulated by a membrane.

The hydrogen oxidizing material, in combination with the activating catalyst, absorbs hydrogen gas that leaks out of the hydrogen fuel cell. The absorption of the hydrogen gas can occur by the oxidation of hydrogen gas to water. The hydrogen oxidizing material oxidizes hydrogen. The activating catalyst lowers the activation energy of the oxidation process between the hydrogen oxidizing material and hydrogen, thereby increasing the rate at which the oxidation occurs. An example of a hydrogen oxidizing material includes, but is not limited to, a manganese oxide, a manganese oxyhydroxide, a nickel oxyhydroxide, a copper oxide, a barium oxide, a silver oxide, a mercury oxide, potassium permanganate, silver permanganate, manganese phosphate, bismuth trioxide, m-dinitrobenzene, and quinone.

The activating catalyst can include a first component and a second component that are capable of cleaving hydrogen. The first and second components can each be selected from transition metals, such as Group VIII metals, alloys, oxides or salts. Examples of activating catalyst components include, but are not limited to, platinum, palladium, or ruthenium metals, oxides, salts, or mixtures thereof. The activating catalyst can include platinum chloride and/or ruthenium chloride, or platinum sulfate and/or ruthenium sulfate. In some cases, the activating catalyst is supported on an oxide, carbon, or an inorganic substrate such as high surface area alumina, silica, or a molecular sieve.

Suitable binder materials are permeable to hydrogen, methanol, ethanol, formic acid, hydrazine or other fuels (e.g., methane, propane, butane, or ammonia), and to oxygen and water vapor. A suitable binder is a gas-permeable matrix. The binder increases the active surface area of the hydrogen oxidizing material and the activating catalyst relative to a powdered, non-dispersed form of the hydrogen oxidizing material and the activating catalyst. In powder form, the hydrogen oxidizing material and the activating catalyst may form clumps or small masses which inhibit the long-term hydrogen oxidation, i.e., the oxidation rate of hydrogen gas after the outer surface of the mass is fully reduced. The binder material can be an inorganic solid or a polymer. An example of an inorganic solid can be a cement, such as Portland Cement or Plaster of Paris. An example of a polymer includes polyisobutylene, EP rubber and silicone polymer, such as GE SILICONE II™ silicone rubber (available from GE, located in Waterford, N.Y.).

Instead of being dispersed in, e.g., silicone, the hydrogen consuming agent can be dispersed in another permeable polymer, or can be bound in latex paint. The hydrogen consuming agent can be adhered to a surface by an adhesive, e.g., PVC emulsion adhesive, alkyd resin emulsion, or butyl latex emulsion.

An example of a suitable hydrogen consuming agent is a dispersion of copper oxide doped with platinum chloride and ruthenium chloride in silicone.

The hydrogen consuming agent can be encapsulated by a membrane. The membrane can be a thin layer of a gas-permeable polymer that is a different material from the gas-permeable matrix. Such encapsulation can prevent or reduce the incidence of flaking or shedding of the fuel consuming agent, or can provide protection from abrasion. An encapsulated catalyst may allow for relatively easy washing of the coating with water or other liquids without removing the hydrogen oxidizing material.

A preferred material for encapsulating the hydrogen consuming agent is permeable to hydrogen gas, methanol, ethanol, formic acid, hydrazine, or other fuels (e.g., methane, propane, butane, or ammonia), and to oxygen gas and water vapor. Suitable membrane materials include polyolefins, such as polyethylene, plastics, rubbers, elastomers, fluoroelastomers and paraffin wax. Other membrane materials include polypropylene, polyethylene/polypropylene copolymers and blends, polybutylene, and blends of waxes with polyolefins. The thickness of the encapsulating membrane can be adjusted to provide structural support for the catalyst. The encapsulating membrane can be less than about 0.015 inch thick (e.g., between about 0.010 inch and about 0.0005 inch thick).

The hydrogen consuming agent can include, for example, between about 75 and about 85 weight percent of a hydrogen oxidizing material, between about 0.05 and about six weight percent activating catalyst, and between about 10 and about 20 weight percent of a binder. The hydrogen consuming agent can include between about one and about five weight percent of an encapsulation material. Preferably, the hydrogen consuming agent includes between about 0.1 and about two weight percent activating catalyst. More preferably, the hydrogen consuming agent includes between about 0.05 and about 0.2 weight percent of a first activating catalyst, such as platinum or palladium metals, oxides, or salts thereof, and between about 0.2 and about 1.8 weight percent of a second activating catalyst, such as ruthenium metal, or an oxide or salt thereof.

While a hydrogen consuming agent has been discussed above, in cases in which a fuel consuming agent is applied to or in the vicinity of a methanol fuel cell or a methanol cartridge, the fuel consuming agent can be a methanol consuming agent. Other fuels and fuel cells which can have a fuel consuming agent applied in their vicinity are those operating on ethanol, methane, propane, butane, formic acid, hydrazine, or ammonia. A hydrogen consuming agent, such as the hydrogen recombination catalysts and hydrogen getters described in U.S. Pat. No. 6,500,576 and U.S. Pat. No 6,333,123, can be used as a fuel consuming agent for methanol, ethanol, methane, propane, butane, formic acid, hydrazine, or ammonia fuel cells. The hydrogen consuming agent can cause flameless catalytic combustion of methanol, ethanol, methane, propane, butane, formic acid, hydrazine, or ammonia.

In some embodiments, the fuel cell, fuel cartridge, or container includes a fuel sensor that notifies the user of a fuel leak. The fuel sensor can, for example, be a catalyzed copper oxide patch that changes color upon contacting hydrogen gas, e.g., from black to copper colored, thereby providing visual indication of a hydrogen gas leak.

In some cases, the hydrogen consuming agent is a sheet of hydrogen consuming material that is, for example, trapped between two layers of breathable material (e.g., paper, non-woven polyolefin fiber paper such as TYVEK® sheet material (available from DuPont), leather, cloth, or felt) within a container. The hydrogen consuming agent can be in the form of a patch of material that can, for example, be sewn onto the clothing of a person who works in the vicinity of a hydrogen fuel cell or hydrogen fuel source.

The hydrogen consuming agent may be applied to the fuel cell, fuel cartridge, or container surface by, for example, spraying, painting, printing, dip coating, or using a doctor blade.

A catalyst dispersed in a gas-permeable matrix can be diluted with an aliphatic solvent (e.g., mineral spirits) prior to allowing the gas-permeable matrix to cure. Such a dilution can reduce the viscosity of the dispersion, so that the dispersion can be easily applied as a coating using one of the above-mentioned methods.

The encapsulating membrane can be folded over the dispersion (the binder containing the hydrogen oxidizing material and the activating catalyst), the open edges of the membrane then being heat-sealed. Alternatively, the membrane can be applied as a coating from a melt, solution, suspension, emulsion, latex, or from vapor phase.

The fuel consuming agent can be preconditioned in fuel prior to being used on the fuel cell, fuel cartridge, or container. For example, the above-mentioned hydrogen recombination catalyst (copper oxide doped with platinum chloride and ruthenium chloride) can be preconditioned in hydrogen gas to avoid the release of acid, such as hydrochloric acid, that may be generated when the catalyst is first used.

Other embodiments are within the scope of the following claims.

What is claimed is:

1. An electrochemical cell system comprising:
   a fuel cell comprising:
      a fuel cell housing having a first external surface, and a first internal surface defining a first internal volume of the fuel cell housing, and
      a cathode, an anode, and an electrolyte disposed within the first internal volume;

a fuel cartridge connected to the fuel cell, the cartridge comprising:
  a cartridge housing having a second external surface and a second internal surface defining a second internal volume of the cartridge housing, wherein the second internal volume includes a fuel; and
  a fuel consuming agent, comprising a mixture of an oxidizing material and an activating material, the fuel consuming agent being disposed on at least one of the first external surface and the second external surface,
wherein the oxidizing material and the activating material each comprise a metal.

2. The eletrochemical cell system of claim 1, wherein the fuel cell comprises a hydrogen fuel cell.

3. The electrochemical cell system of claim 2, wherein the fuel consuming agent comprises a hydrogen consuming agent.

4. The electrochemical cell system of claim 3, wherein the-fuel cartridge comprises a hydrogen fuel cartridge.

5. The eletrochemical cell system of claim 1, wherein, the fuel is selected from the group consisting of methanol, ethanol, methane propane, butane, formic acid, hydrazine, and ammonia.

6. An electrochemical cell system comprising:
  a fuel cell comprising a fuel cell housing;
  a fuel cartridge connected to the fuel cell, the cartridge comprising a cartridge housing; and
  a fuel consuming agent, comprising a mixture of an oxidizing material and an activating material, the fuel consuming agent being disposed on at least one of an external surface of the fuel cell housing and an external surface of the cartridge housing;
  wherein the oxidizing material and the activating material each comprise a metal.

7. The electrochemical cell system of claim 6, wherein the fuel cell comprises a hydrogen fuel cell.

8. The electrochemical cell system of claim 7, wherein the fuel consuming agent comprises a hydrogen consuming agent.

9. The electrochemical cell of claim 8, wherein the fuel cartridge comprises a hydrogen fuel cartridge.

10. The electrochemical cell system of claim 8, wherein the hydrogen consuming agent comprises a hydrogen recombining agent.

11. The electrochemical cell system of claim 1, wherein the activating material includes a first activating component and a second activating component, the first and second activating components each being capable of cleaving hydrogen.

12. The electrochemical cell system of claim 1. wherein the oxidizing material comprises a compound selected from the group consisting of a manganese oxide, a manganese oxyhydroxide, a nickel oxyhydroxide, a copper oxide, a barium oxide, a silver oxide, a mercury oxide, potassium permanganate, silver permanganate, a manganese phosphate. a bismuth oxide, m-dinitrobenzene, and a quinone.

13. The electrochemical cell system of claim 12 wherein the oxidizing material comprises copper oxide.

14. The electrochemical cell system of claim 11, wherein the oxidizing material comprises copper oxide.

15. The electrochemical cell system of claim 14, wherein the transition metal is selected from the group consisting of palladium, platinum, and ruthenium.

16. The electrochemical cell system of claim 11, wherein the second activating component of the activating material includes a transition metal, or a salt or oxide thereof.

17. The electochemical cell system of claim 16, wherein the transition metal is selected from the group consisting of palladium, platinum, and ruthenium.

18. The electrochemical cell system of claim 6, wherein the, fuel cell housing is releasably engageable with the cartridge housing.

19. The electrochemical cell system of claim 8, wherein the hydrogen consuming agent is dispersed in a gas-permeable matrix.

20. The electrochemical cell system of claim 19, wherein the hydrogen consuming agent is dispersed in a silicone polymer.

21. The electrochemical cell system of claim 8, further comprising a coating over the hydrogen consuming agent.

22. The electrochemical cell system of claim 6, wherein the fuel cell is a methanol fuel cell, an ethanol fuel cell, a methane fuel cell, propane fuel cell, a butane fuel cell a formic acid fuel cell a hydrazine fuel cell, or an ammonia fuel cell.

23. The electrochemical cell of claim 6, further comprising a fuel sensor.

24. The electrochemical cell of claim 23, wherein the fuel sensor is configured to change color upon contacting leading fuel, so as to provide a visual indication of a fuel leak.

25. An electrochemical cell system comprising:
  a container having an internal surface defining an internal volume; and
  a fuel consuming agent, comprising a mixture of an oxidizing material and an activating material each of the oxidizing material and the activating material comprising a metal, and a fuel cell disposed within the internal volume, the fuel cell comprising a fuel cell housing;
  wherein the fuel consuming agent is disposed on an external surface of the fuel cell housing.

26. The electrochemical cell system of claim 25, further comprising a fuel cartridge connected to the fuel cell.

27. The electrochemical cell system of claim 25, wherein the fuel cell comprises a hydrogen fuel cell.

28. The electrochemical cell system of claim 27, wherein the fuel consuming agent comprises a hydrogen consuming agent.

29. The electrochemical cell system of claim 25, wherein the fuel cell is a methanol fuel cell, an ethanol fuel cell, a methane fuel cell, a propane fuel cell, a butane fuel cell, a formic acid fuel cell, a hydrazine fuel cell, or an ammonia fuel cell.

30. An electrochemical cell system comprising:
  a container having an internal surface defining an internal volume; and
  a fuel consuming agent, comprising a mixture of an oxidizing material and an activating material, each of the oxidizing material and the activating material comprising a metal, and a fuel cartridge disposed within the internal volume;
  wherein the fuel consuming agent is disposed on an external surface of the fuel cartridge.

31. The electrochemical cell system of claim 30, wherein the fuel cartridge comprises a hydrogen fuel cartridge.

32. The electrochemical cell system claim 31, wherein the fuel consuming agent comprises a hydrogen consuming agent.

33. The electrochemical cell system of claim 30, wherein the fuel cartridge is a methanol fuel cartridge, an ethanol fuel cartridge, a methane fuel cartridge, a propane fuel cartridge, a butane fuel cartridge, a formic acid fuel cartridge, a hydrazine fuel cartridge, or an ammonia fuel cartridge.

* * * * *